(12) United States Patent
Hengstler

(10) Patent No.: US 10,317,299 B2
(45) Date of Patent: Jun. 11, 2019

(54) PRESSURE SENSOR

(71) Applicant: VEGA GRIESHABER KG, Wolfach (DE)

(72) Inventor: Clemens Hengstler, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 140 days.

(21) Appl. No.: 15/479,940

(22) Filed: Apr. 5, 2017

(65) Prior Publication Data

US 2017/0299454 A1    Oct. 19, 2017

(30) Foreign Application Priority Data

Apr. 11, 2016 (EP) .................................... 16164736

(51) Int. Cl.
| | | |
|---|---|---|
| *G01L 9/00* | (2006.01) | |
| *G01L 9/14* | (2006.01) | |
| *G01L 19/04* | (2006.01) | |
| *G01L 13/02* | (2006.01) | |

(52) U.S. Cl.
CPC .......... *G01L 9/0091* (2013.01); *G01L 13/025* (2013.01); *G01L 19/04* (2013.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/0069; G01L 19/0618; G01L 19/0645; G01L 9/0052

USPC ...................................................... 73/700–756
See application file for complete search history.

(56) References Cited

U.S. PATENT DOCUMENTS

| | | | | |
|---|---|---|---|---|
| 3,596,520 A | * | 8/1971 | Sanford | ................... G01L 9/007 73/708 |
| 2002/0026835 A1 | * | 3/2002 | Jacob | ..................... G01L 9/0075 73/708 |
| 2008/0156102 A1 | * | 7/2008 | Kopp | ................... G01L 19/0084 73/706 |
| 2011/0100130 A1 | * | 5/2011 | Gruhler | ................... G01L 1/142 73/708 |
| 2016/0320256 A1 | * | 11/2016 | Burgard | ................ G01L 9/0072 |
| 2017/0343440 A1 | * | 11/2017 | Drewes | ................. G01L 9/0075 |
| 2018/0128699 A1 | * | 5/2018 | Hengstler | ............... G01L 13/02 |

OTHER PUBLICATIONS

EPO search report for related international application 16 164736.7, dated Oct. 24, 2016.

* cited by examiner

*Primary Examiner* — Andre J Allen

(74) *Attorney, Agent, or Firm* — William Gray Mitchell

(57) ABSTRACT

A pressure sensor comprising at least a pressure measuring cell, a pressure balancer, as well as at least one measurement line to transfer a pressure applied to the pressure means to the pressure measuring cell, wherein the pressure sensor comprises at least one compensation line showing the same features as the measurement line, which is arranged parallel in reference to the measurement line.

10 Claims, 4 Drawing Sheets

PRIOR ART

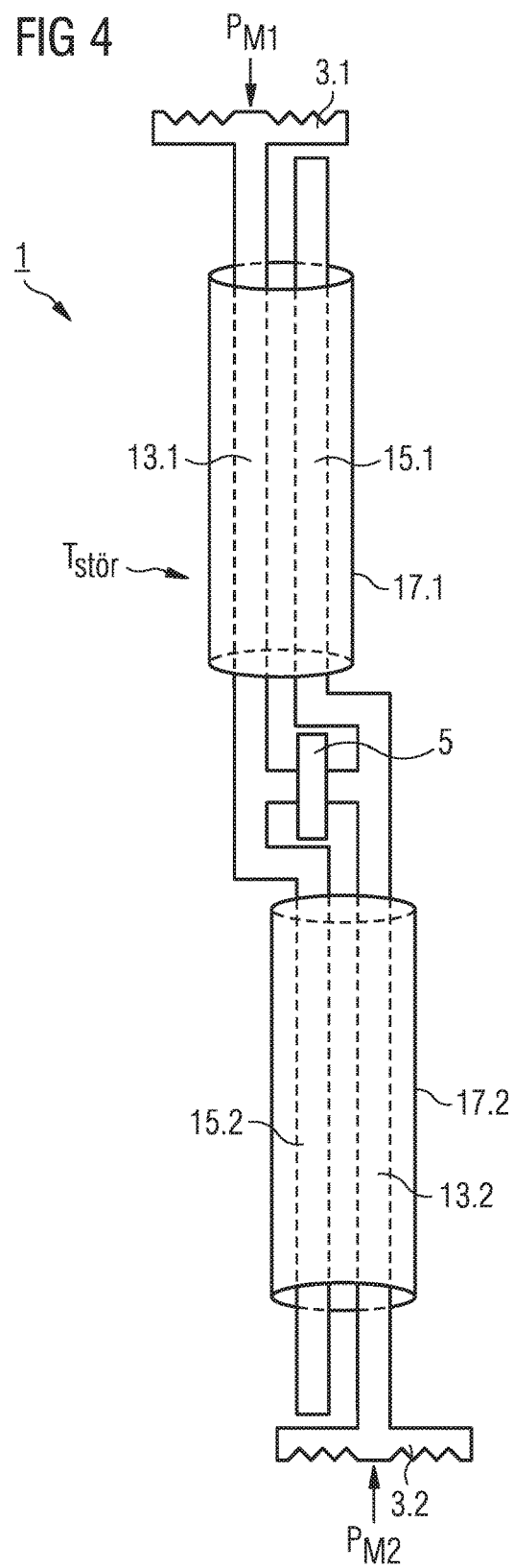

PRESSURE SENSOR

CROSS REFERENCE TO RELATED APPLICATIONS

This patent application claims priority to European Patent Application 16 164736.7, filed on Apr. 11, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a pressure sensor with at least one pressure measuring cell.

Background of the Invention

The present invention relates to a pressure sensor with at least one pressure measuring cell, a diaphragm seal, as well as at least one measuring line for transferring a pressure applied upon the diaphragm seal to the measuring cell.

Such measuring cells are known from prior art and are normally used for pressure measurements in processing environments with high processing temperature, because the electronics of the pressure sensor may not be heated beyond a certain temperature, for example 125° C. FIG. 1 shows an exemplary pressure sensor 1 according to prior art. The pressure sensor 1 essentially comprises a housing 11, in which an electronic measuring system and a pressure measuring cell 5 are arranged. The pressure measuring cell 5 is connected via a measuring line, which in the present case is formed as capillaries 7, to a diaphragm seal 3, which is arranged at a process connection 9. The diaphragm seal and the capillaries are filled with an incompressible transfer medium, usually oil, in order to transfer processing pressure applied upon the diaphragm seal 3 to the pressure measuring cell 5.

Via the process connection 9 the diaphragm seal 3 can be arranged in a processing environment. Usually this represents a tank or a pipeline, wherein it is intended to measure a pressure inside the tank and/or the pipeline as the processing pressure.

In pressure sensors of the above-described type known from prior art it is considered disadvantageous that additional temperature influences outside the processing environment, for example applied upon the capillaries, and/or mechanical influences upon the capillaries, for example strong bending thereof, can falsify the measurement. Further it is considered disadvantageous that the processing temperature influencing the diaphragm seal also causes measurement faults. The temperature induced measurement faults result here in an expansion of the transfer medium contained in the diaphragm seal and the capillaries, which leads to a pressurization of the pressure measuring cell.

It is known in prior art to detect such temperature induced measurement faults via temperature sensors inside the pressure balancer and/or the pressure measuring cell and to electronically compensate them. The presence of additional temperature sensors, ideally inside the diaphragm seal and the pressure measuring cell, is however considered disadvantageous due to the increased wiring expense and the higher costs for the additionally required sensors.

The objective of the present invention is to further develop a pressure sensor with at least one pressure measuring cell, a pressure balancer, as well as at least one measuring line for transferring a pressure applied upon the diaphragm seal to the pressure measuring cell such that a temperature-induced and mechanically induced measurement fault can be compensated more cost effectively and more precisely.

BRIEF SUMMARY OF THE INVENTION

In a preferred embodiment, a pressure sensor (1) with at least one pressure measuring cell (5), a diaphragm seal (3), as well as at least one measurement line (13) for transferring a pressure applied upon the diaphragm seal (3) to the pressure measuring cell (5), characterized in that the pressure sensor (1) comprises at least one compensation line (15), arranged parallel in reference to the measurement line (13).

In another preferred embodiment, the pressure sensor (1) as described herein, characterized in that the compensation line (15) shows the same features as the measurement line (13).

In another preferred embodiment, the pressure sensor (1) as described herein, characterized in that the compensation line (15) is connected to a pressure-insensitive element (4) that is formed like the diaphragm seal (3), which is subjected to the process conditions in the same fashion as the diaphragm seal (3).

In another preferred embodiment, the pressure sensor (1) as described herein, in that the pressure-insensitive element (4) is integrated in a process connection (9) jointly with the diaphragm seal (3).

In another preferred embodiment, the pressure sensor (1) as described herein, characterized in that the pressure-insensitive element (4) is embodied surrounding the diaphragm seal (3) in an annular fashion.

In another preferred embodiment, the pressure sensor (1) as described herein, characterized in that the pressure-insensitive element (4) shows an area facing the process with a size, which is approximately equivalent to the size of an area of the diaphragm seal (3) facing the process, preferably is identical thereto.

In another preferred embodiment, the pressure sensor (1) as described herein, characterized in that the measurement line (13) and the compensation line (15) are arranged in a common protective cover (17).

In another preferred embodiment, the pressure sensor (1) as described herein, characterized in that the pressure measuring cell (5) is embodied as a pressure difference measuring cell with two sides that can be impinged on with pressure, which cell is connected at the one side to the measurement line (13) and at the other side to the compensation line (15).

In another preferred embodiment, the pressure sensor (1) as described herein, characterized in that the pressure sensor (1) comprises a first and a second diaphragm seal (3.1, 3.2) and two compensation lines (15.1, 15.2), wherein the pressure difference measuring cell is connected at one side to the measurement line (13.1) of the first diaphragm seal (3.1) and the compensation line (15.2) allocated to the second diaphragm seal (3.2), and on the other side to the measuring line (13.2) of the second diaphragm seal (3.2) and the compensation line (15.1) allocated to the first diaphragm seal (3.1).

In another preferred embodiment, the pressure sensor (1) as described herein, characterized in that a first pressure measuring cell (5.1) is connected to the measurement line (13), and renders available a measurement, a second pressure measuring cell (5.2), connected to the compensation line (15), and renders available a compensation value, as well as an electronic measuring system (19), with the measurement and the compensation value being fed to the input thereof and a compensated measurement value being provided at its output side.

BRIEF DESCRIPTION OF THE DRAWINGS

FIG. 4 is a line drawing evidencing a third exemplary embodiment of a pressure sensor according to the present application

DETAILED DESCRIPTION OF THE INVENTION

Figure 1:
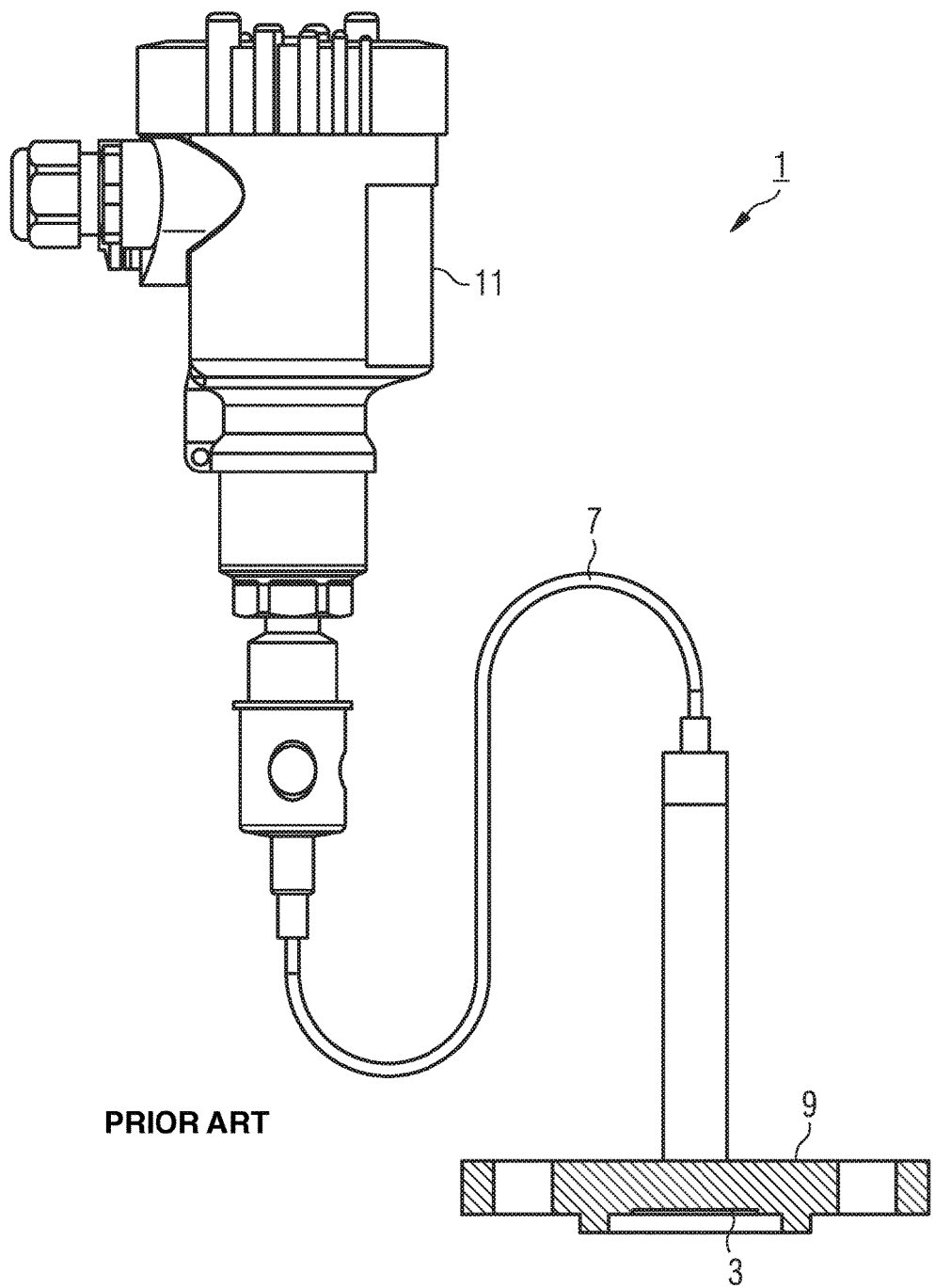
FIG. 1 is a line drawing evidencing a pressure sensor according to prior art.

The pressure sensor according to the invention, comprising at least one pressure measuring cell, a pressure balancer, as well as at least one measurement line for transferring a pressure applied upon the diaphragm seal to a pressure measuring cell, is characterized in that the pressure sensor comprises at least one compensation line, which shows preferably the same features as the measurement line, wherein the compensation line is preferably arranged parallel in reference to the measurement line.

The present invention is based on the acknowledgment that precise and cost-effective compensation of thermally and mechanically induced measurement faults can occur particularly easily by compensating the measurement fault in a mechanical fashion, wherein preferably the following expensive electronic compensation devices can be waived or at least be embodied in a much less expensive fashion.

By the compensation line provided according to the invention, which preferably shows the same features as the measurement line and is preferably arranged parallel to the measurement line, it is achieved that a temperature applied upon the measurement line and/or a mechanical impact upon the measurement line equally influences the compensation line. Due to the fact that the measurement line and the compensation line show identical features, which include particularly identical thermal and mechanical features, external influences trigger identical effects in both lines so that a measurement fault occurring in the measurement line, particularly a change in pressure, triggers the same effect in the compensation line. A compensation of the measurement fault can then occur mechanically and/or electronically.

The measurement line and the compensation line shall further ideally be filled with the same transfer medium, preferably show the same cross-section, contain the same volume of transfer medium, and be arranged as closely as possible to each other.

The measurement line and the compensation line can here be embodied as so-called capillaries, i.e. as flexible lines, as pipelines, as bores in an element arranged between the diaphragm seal and the pressure measuring cell, or combinations thereof.

The influence of the processing temperature upon the measurements can be compensated in a particularly simple fashion if the compensation line is connected to a pressure-insensitive element recreating the pressure balancer, which is subjected to the same processing conditions in the same fashion as the pressure balancer. With a respective pressure-insensitive element recreating the diaphragm seal it is achieved that the processing temperature affects in the same fashion the transfer medium contained in the compensation line as that in the pressure balancer, so that in both lines, the compensation line and the measurement line, the same temperature impact is yielded and thus in both lines the same heating and thus expansion of the transfer medium occurs.

A particularly clever arrangement can be yielded by integrating the diaphragm seal and the pressure-insensitive element recreating the diaphragm seal when the pressure-insensitive element and the diaphragm seal are jointly arranged in a processing connection for arranging the diaphragm seal in a process environment.

A particularly space-saving arrangement, which also shows as homogenous as possible a temperature impact upon the diaphragm seal and the pressure-insensitive element, is given when the pressure-insensitive element is embodied surrounding the diaphragm seal in an annular fashion. Such an arrangement is suggested because the diaphragm seal generally shows a circularly embodied membrane to compensate for the pressure in the process environment.

In order to yield a temperature impact upon the diaphragm seal and the pressure-insensitive element as homogeneously as possible it is advantageous for the pressure-insensitive element to show an area facing the process with a size that is approximately equivalent to the area of the diaphragm seal facing the process, preferably is identical thereto. In a concrete embodiment here the annular area of the pressure-insensitive element surrounding the diaphragm seal is identical to the membrane area of the pressure balancer.

Influences of temperature and mechanical influences applied upon the transfer line arranged between the diaphragm seal and the pressure measuring cell can be compensated in a particularly good fashion when the measurement line and the compensation line are arranged in a common cover embodied as a mechanically protective means. By an appropriately common cover any temperature influences are evenly distributed to the measurement line and the compensation line so that temperature influences affect both lines identically. By such mechanical protection, any mechanical influences, for example excessively tight radii or bends, particularly in case of capillaries, are also transferred to both lines such that measurement faults induced thereby also affect both lines simultaneously.

The pressure measuring cell can here be embodied as a conventional pressure measuring cell, with its measuring membrane being embodied that it is impinged from one side, particularly the front, with the pressure of the measurement line and from the other side, particularly the rear, with the pressure of the compensation line. This represents a more cost-effective solution.

Alternatively, the pressure measuring cell can be embodied to detect both positive as well as negative pressures.

Here, compensation of the measurement fault induced by temperature or mechanical influences can then occur for example such that the pressure measuring cell is embodied as a pressure cell with two sides that pressure may impinge upon, which on one side is connected to the measurement line and on the other side to the compensation line. This way on the one side the measuring pressure and the measurement fault are applied to the pressure measuring cell and on the other side only the measurement fault, which results in that a purely mechanical compensation of the measurement fault occurs in the pressure measuring cell.

The present invention can therefore also be used advantageously for pressure sensors used for measuring pressure differences.

Such a pressure sensor is characterized in that the sensor comprises a first and a second diaphragm seal and two compensation lines, wherein the pressure difference measuring cell is connected on one side to the measurement line of the first diaphragm seal and the compensation line allocated to the second pressure balancer, and on the other side to the measurement line of the second diaphragm seal and the compensation line allocated to the first pressure balancer. This way temperature induced and mechanically induced measurement faults are compensated by purely mechanical means at both sides of the diaphragm seal such that no additional electronic measuring system is required.

As an alternative to compensating measurement faults via a pressure difference measuring cell, the pressure sensor may also show two pressure measuring cells and subsequently here electronic compensation of measurement faults can occur. A respective sensor shows a first pressure measuring cell and a second pressure measuring cell as well as an electronic measuring system. The first pressure measuring cell is connected to the measurement line, wherein this allows the detection of a measurement at the first pressure measuring cell at the outlet side. The second pressure measuring cell is connected to the compensation line wherein this allows the detection of a compensation value at the second pressure measuring cell at the outlet side. The measurement and the compensation value are both fed to the electronic measuring system, wherein by forming a difference therefrom this yields a compensated measurement, which can be obtained at the outlet side.

DETAILED DESCRIPTION OF THE FIGURES

FIG. 1 illustrates the prior art.

Figure 2:
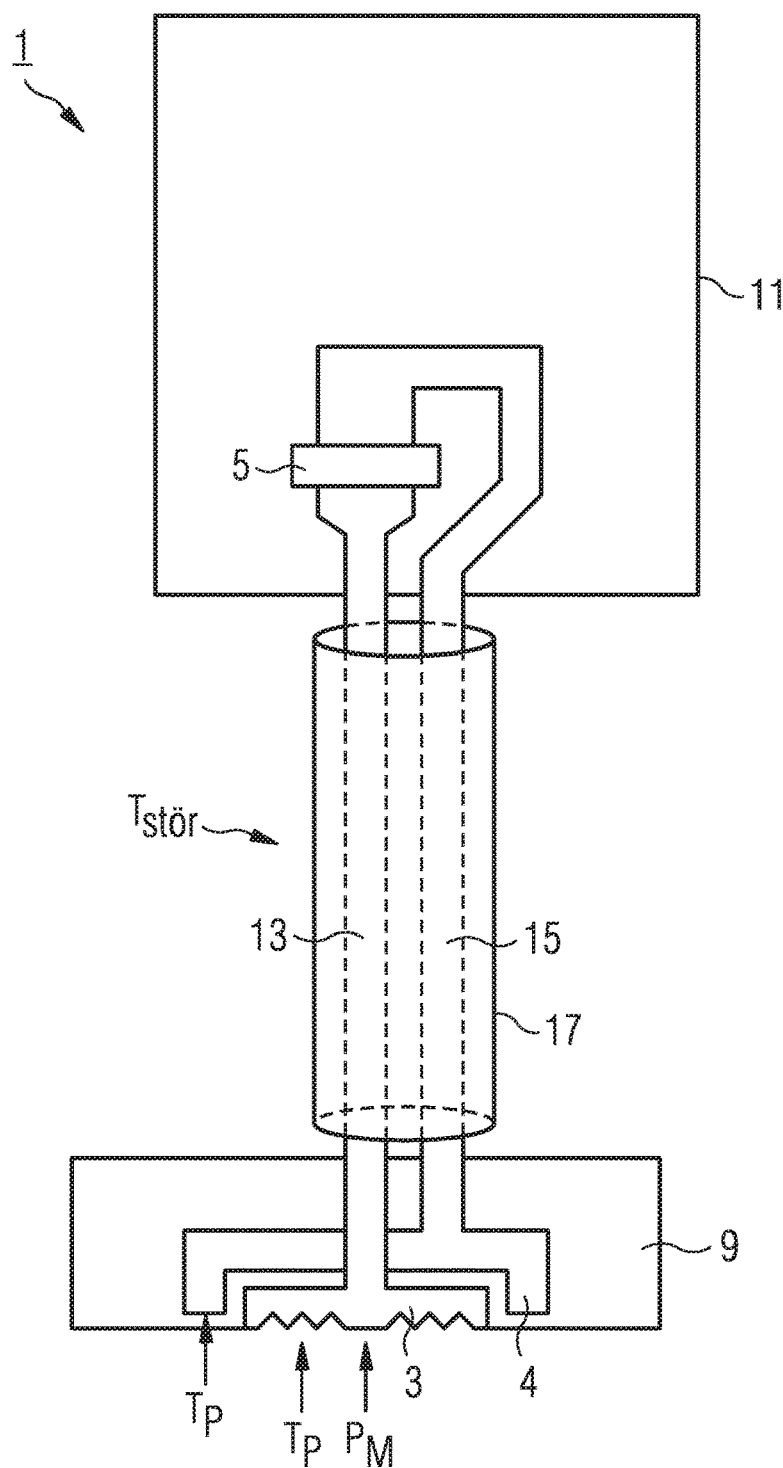
FIG. 2 is a line drawing evidencing a first exemplary embodiment of a pressure sensor according to the present application.

FIG. 2 shows a first exemplary embodiment of a pressure sensor 1 according to the present application. The pressure sensor 1 essentially comprises a pressure measuring cell 5, which is arranged in a housing 11 of the pressure sensor 1. The pressure measuring cell 5 is embodied in the present exemplary embodiment as a pressure difference measuring cell and connected with one of its connections via a measurement line 13 to a diaphragm seal 3. With its second connector the pressure difference measuring cell 5 is connected via a compensation line 15 to a pressure-insensitive element 4. The diaphragm seal 3 and the pressure-insensitive element 4 are both arranged in a process connection 9 to fasten the diaphragm seal 3 in a process environment.

Alternatively, the pressure measuring cell 5 can be embodied in the present design also as a conventional pressure measuring cell or as a Piezo-measuring cell.

Both the measurement line 13 and the compensation line 15 are filled with an incompressible transfer medium, for example oil. This way a measuring pressure $p_M$, applied upon the diaphragm seal 3, is transferred via the measurement line 13 to the first connection of the pressure difference-measuring cell 5. The compensation line is connected at the other connection of the pressure difference measuring cell 5, which is also filled with the transfer medium.

In the present exemplary embodiment the measurement line 13 and the compensation line 15 are arranged in a common cover 17, which acts as a mechanical protection for both lines 13, 15. With the cover 17 it is ensured that an interfering temperature $T_{INTERFERE}$, acting in the area of the lines 13, 15 upon the pressure sensor 1, identically impacts the measurement line 13 and the compensation line 15. A change in volume of the transfer medium in the measurement line 13 and the compensation line 15, induced by temperature, is therefore triggered identically in both lines.

Further, the pressure-insensitive element 4 is integrated in the process connection 9, annularly surrounding the diaphragm seal 3. The diaphragm seal 3 and the pressure-insensitive element 4 show in the present exemplary embodiment areas of identical size facing the process environment such that any influence of the process temperature $T_P$ upon the diaphragm seal 3 and the pressure-insensitive element 4 also occurs identically. Only the process pressure $P_M$ impacts exclusively the diaphragm seal 3. With the present embodiment it is possible that any temperature-induced measurement faults caused by a volume change of the transfer medium, triggered by the process temperature $T_P$ or the interference temperature $T_{INTERFERE}$, occur identically in the measurement line 13 as well as the compensation line 15. This effect is in particular also supported by the fact that in the measurement line 13 and in the compensation line 15 the same volume of transfer medium is filled and the measurement line 13 and the compensation line 15 are guided parallel in reference to each other in the cover 17.

Due to the fact that the pressure difference measuring cell 5 is connected at its first connection to the measurement line 13 and at its other connection to the compensation line 15, here a purely mechanical compensation of temperature-induced measurement faults is achieved. Here, in the measuring line 13 the measuring pressure $P_M$ is effective as well as a pressure $P_T$ induced by the process temperature $T_P$ and the interfering temperature $T_{INTERFERE}$. Now only the temperature-induced pressure $P_T$ acts in the compensation line 15, because the pressure-insensitive element 4 prevents any impact of the measuring pressure $P_M$. Due to the intrinsic features of the pressure difference measuring cell, here the pressure difference measuring cell 5 only detects the measuring pressure $P_M$ and renders it available via a suitable electronic system. The present embodiment of the pressure sensor 1 does not exclude the provision of any additional electronic devices for compensating measurement faults. Due to the very simple and direct compensation of temperature-induced measurement faults provided, these can be designed in a considerably less complex fashion than those of prior art.

Due to the fact that in the present exemplary embodiment the measurement line 13 and the compensation line 15 are guided in a common cover 17 and this common cover 17 simultaneously acts as a mechanical protection for the two lines 13, 15, additionally mechanically induced measurement faults are considerably reduced and further, due to the common guide in the cover 17, they also affect both lines 13, 15 identically, so that here too an automatic compensation of respective measurement faults occurs.

Figure 3:
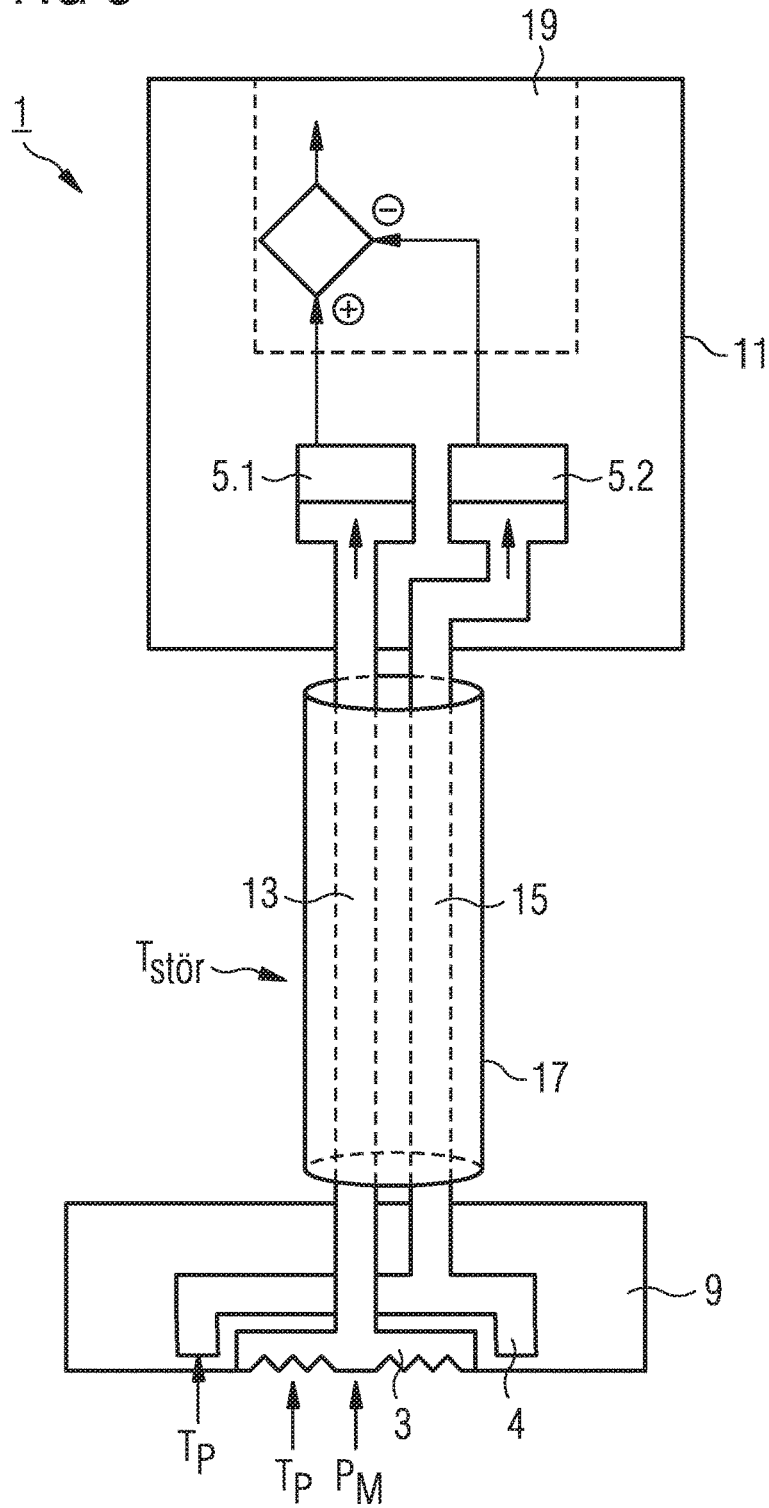
FIG. 3 is a line drawing evidencing a second exemplary embodiment of a pressure sensor according to the present application.

FIG. 3 shows another exemplary embodiment of a pressure sensor 1 according to the present application. Unlike the exemplary embodiment illustrated in FIG. 2 the exemplary embodiment according to FIG. 3 shows no pressure difference measuring cell but two separate measuring cells 5.1 and 5.2. The first of these two measuring cells 5.1 is connected via the measurement line 13 to the diaphragm seal 3 and the second of the measuring cells 5.2 via the compensation line 15 to the pressure-insensitive element 4.

According to the present exemplary embodiment respectively here compensation of measurement faults occurs not in a mechanical fashion but rather such that the measurement fault is eliminated in an electronic measuring system 19, arranged downstream in reference to one of the pressure measuring cells 5.1, 5.2, by forming a difference. This can occur either in an analog or digital fashion.

FIG. 4 shows a third exemplary embodiment, in which pressure difference sensors can be used according to the present invention.

The pressure sensor 1 shown in FIG. 4 comprises a pressure difference measuring cell 5, wherein in the present exemplary embodiment two pressure balancers 3.1 and 3.2 being provided. The first diaphragm seal 3.1 is here connected via a first measurement line 13.1 to one side of the pressure difference sensor 5. The compensation line 15.1 allocated to the first diaphragm seal 3.1, as already discussed with reference to the exemplary embodiment shown in FIG. 2, is connected to the other side of the pressure difference sensor 5 such that compensation occurs of measurement faults induced in reference to the first diaphragm seal 3.1. In order to allow measuring a pressure difference the second diaphragm seal 3.2 is connected via a second measurement line 13.2 to the input of the pressure difference measuring cell 5 opposite the first measurement line 13.1. Accordingly, measurement faults induced in reference to the second diaphragm seal 3.2 are coupled via a second compensation line 15.2 to the other input of the pressure difference measuring cell 5, i.e. the same input by which the first diaphragm seal 3.1 is also connected. Both pressure balancers 3.1, 3.2 are therefore error compensated such that the pressure difference measuring cell 5 only detects the pressure difference between the two measurement pressures P1 and P2. As already described in connection with the previous exemplary embodiments the measurement lines and compensation lines 13.1, 15.1, 13.2, 15.2 are each arranged in common covers 17.1, 17.2 such that an even impact is ensured of temperature and mechanical influences.

LIST OF REFERENCE NUMBERS

1 Pressure sensor
3 Diaphragm seal
4 Pressure-insensitive element
5 Pressure measuring cell
7 Capillaries
9 Process connection
11 Housing
13 Measurement line
15 Compensation line
17 Cover
19 Electronic measuring system
$P_M$ Measuring pressure
$T_P$ Process temperature
$P_T$ Temperature-induced pressure The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

The invention claimed is:

1. A pressure sensor with at least one pressure measuring cell, a diaphragm seal, as well as at least one measurement line for transferring a pressure applied upon the pressure means to the pressure measuring cell, wherein the pressure sensor comprises at least one compensation line, arranged parallel in reference to the measurement line.

2. The pressure sensor according to claim 1, wherein the compensation line shows the same features as the measurement line.

3. The pressure sensor according to claim 1, wherein the compensation line is connected to a pressure-insensitive element that is formed like the diaphragm seal, which is subjected to the process conditions in the same fashion as the pressure means.

4. The pressure sensor according to claim 3, wherein the pressure-insensitive element is integrated in a process connection jointly with the diaphragm seal.

5. The pressure sensor according to claim 4, wherein the pressure-insensitive element is embodied surrounding the diaphragm seal in an annular fashion.

6. The pressure sensor according to claim 5, wherein the pressure-insensitive element shows an area facing the process with a size, which is approximately equivalent to the size of an area of the diaphragm seal facing the process, preferably is identical thereto.

7. The pressure sensor according to claim 1, wherein the measurement line and the compensation line are arranged in a common protective cover.

8. The pressure sensor according to claim 1, wherein the pressure measuring cell is embodied as a pressure difference measuring cell with two sides that can be impinged on with pressure, which cell is connected at the one side to the measurement line and at the other side to the compensation line.

9. The pressure sensor according to claim 8, wherein the pressure sensor comprises a first and a second diaphragm seal and two compensation lines, wherein the pressure difference measuring cell is connected at one side to the measurement line of the first diaphragm seal and the compensation line allocated to the second pressure means, and on the other side to the measuring line of the second diaphragm seal and the compensation line allocated to the first diaphragm seal.

10. The pressure sensor according to claim 1, wherein
a first pressure measuring cell is connected to the measurement line, and renders available a measurement,
a second pressure measuring cell, connected to the compensation line, and renders available a compensation value, as well as
an electronic measuring system, with the measurement and the compensation value being fed to the input thereof and a compensated measurement value being provided at its output side.

* * * * *